(12) United States Patent
Kruys

(10) Patent No.: US 8,391,487 B2
(45) Date of Patent: Mar. 5, 2013

(54) SECURE REMOTE CONFIGURATION OF DEVICE CAPABILITIES

(75) Inventor: Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 1101 days.

(21) Appl. No.: 11/782,277

(22) Filed: Jul. 24, 2007

(65) Prior Publication Data
US 2009/0031123 A1    Jan. 29, 2009

(51) Int. Cl.
*G06F 21/00* (2006.01)

(52) U.S. Cl. ...................................................... 380/258

(58) Field of Classification Search ............... 713/1, 176, 713/180; 726/2; 380/258
See application file for complete search history.

(56) References Cited

U.S. PATENT DOCUMENTS

| | | | |
|---|---|---|---|
| 5,530,753 A | | 6/1996 | Easter et al. |
| 6,085,322 A | * | 7/2000 | Romney et al. ............... 713/176 |
| 6,367,009 B1 | * | 4/2002 | Davis et al. ................... 713/166 |
| 6,643,274 B2 | | 11/2003 | D'Annunzio |
| 7,099,337 B2 | | 8/2006 | Pinto |
| 7,349,884 B1 | | 3/2008 | Odom et al. |
| 7,457,869 B2 | * | 11/2008 | Kernan .......................... 709/224 |
| 7,581,106 B1 | * | 8/2009 | Das et al. ...................... 713/176 |
| 2003/0234741 A1 | | 12/2003 | Rogers et al. |
| 2004/0051664 A1 | | 3/2004 | Frank |
| 2004/0098610 A1 | | 5/2004 | Hrastar |
| 2004/0179690 A1 | | 9/2004 | Soliman |
| 2004/0202330 A1 | | 10/2004 | Harvey et al. |
| 2004/0246911 A1 | | 12/2004 | Bonsma et al. |
| 2005/0044265 A1 | | 2/2005 | Vinel et al. |
| 2005/0066194 A1 | | 3/2005 | Campbell et al. |
| 2005/0154872 A1 | | 7/2005 | McGrew |
| 2005/0160138 A1 | | 7/2005 | Ishidoshiro |
| 2005/0188063 A1 | | 8/2005 | Finley et al. |

(Continued)

FOREIGN PATENT DOCUMENTS

JP      2005295408      10/2005

OTHER PUBLICATIONS

U.S. Appl. No. 11/678,286, filed Feb. 23, 2007, Winget.

(Continued)

*Primary Examiner* — Brandon Hoffman
*Assistant Examiner* — Anthony Brown
(74) *Attorney, Agent, or Firm* — Tucker Ellis LLP

(57) ABSTRACT

In one embodiment, the present invention is a method for providing a secure remote configuration. The method includes obtaining a signed configuration file (S-CF) from a storage using a device identity of the device, wherein the device identity of the device is linked with a location of the device. A validated configuration file (V-CF) is then generated using the S-CF. At least one device parameter is then configured using the V-CF. In another embodiment, the present invention is a method for providing a signed configuration file (S-CF) to the device. The method includes processing a request for an S-CF from the device, wherein the request comprises a device identity of the device. A location of the device is then determined using a location database and the device identity of the device. A configuration file (CF) for the location of the device is then obtained from a storage. An S-CF is then generated using the CF. The S-CF is then provided to the device.

12 Claims, 6 Drawing Sheets

U.S. PATENT DOCUMENTS

| | | |
|---|---|---|
| 2005/0201299 A1 | 9/2005 | Radi et al. |
| 2005/0226175 A1 | 10/2005 | Gupta et al. |
| 2005/0288017 A1* | 12/2005 | Doumenc et al. .......... 455/435.3 |
| 2006/0282497 A1 | 12/2006 | Braun et al. |
| 2007/0028109 A1* | 2/2007 | Wysocki et al. .............. 713/176 |
| 2007/0069851 A1 | 3/2007 | Sung et al. |
| 2007/0250515 A1* | 10/2007 | Lea et al. ........................ 707/10 |
| 2008/0164310 A1* | 7/2008 | Dupuy et al. ................. 235/385 |

OTHER PUBLICATIONS

TeleMIP: telecommunications-enhanced mobile IP architecture forfast intradomain mobility; Das, S; Date: Aug. 2000; INSPEC; vol. 7 issue 4; pp. 50-58.

Written Opinion for International Application No. PCT/US2008/083861 dated Jun. 10, 2010.

* cited by examiner

SECURE REMOTE CONFIGURATION OF DEVICE CAPABILITIES

FIELD OF THE INVENTION

The present disclosure relates generally to secure configuration of device parameters. In particular, although not exclusively, the disclosure relates to secure configuration of device parameters using location information.

BACKGROUND

Many countries require that electronic devices, such as radio communication devices, comply with regulatory constraints set by certain national or regional regulatory agencies, such as the Federal Communications Commission in the USA. Therefore, manufacturers exporting their devices to a country certify the devices before accepting orders from the country and providing shipments to the country. Thus manufacturers manage several stock keeping units (SKUs) that are groups of devices. Each SKU is certified for one or more countries, so that the devices of the SKU can be ordered and shipped to the countries.

In order to obtain certification of an electronic device, a manufacturer of the device configures device parameters of the product, such as frequency parameters of transmitters, to limit operation of the product within the regulatory constraints. A device parameter can be hardwired or can be set by data stored in a memory of the device. Since any modification to a device parameter can invalidate certifications of the device, manufacturers need to ensure that device parameters cannot be easily altered once devices are configured.

Therefore, a configuration file for device parameters is usually stored either in a Read Only Memory (ROM) or a reprogrammable non-volatile memory, such as FLASH, before the device is shipped to a destination. This means that manufacturers need maintain a large number of SKUs because there can be many standards (such as 802.11a and 802.11g) or device families, for which a device can be configured. Manufacturers frequently need to update their devices to accommodate new features or to fix unforseen errors and each update can result in a new SKU. Managing SKUs is costly and consumes a significant amount of resources.

DESCRIPTION OF EXAMPLE EMBODIMENTS

Overview

Figure 1:
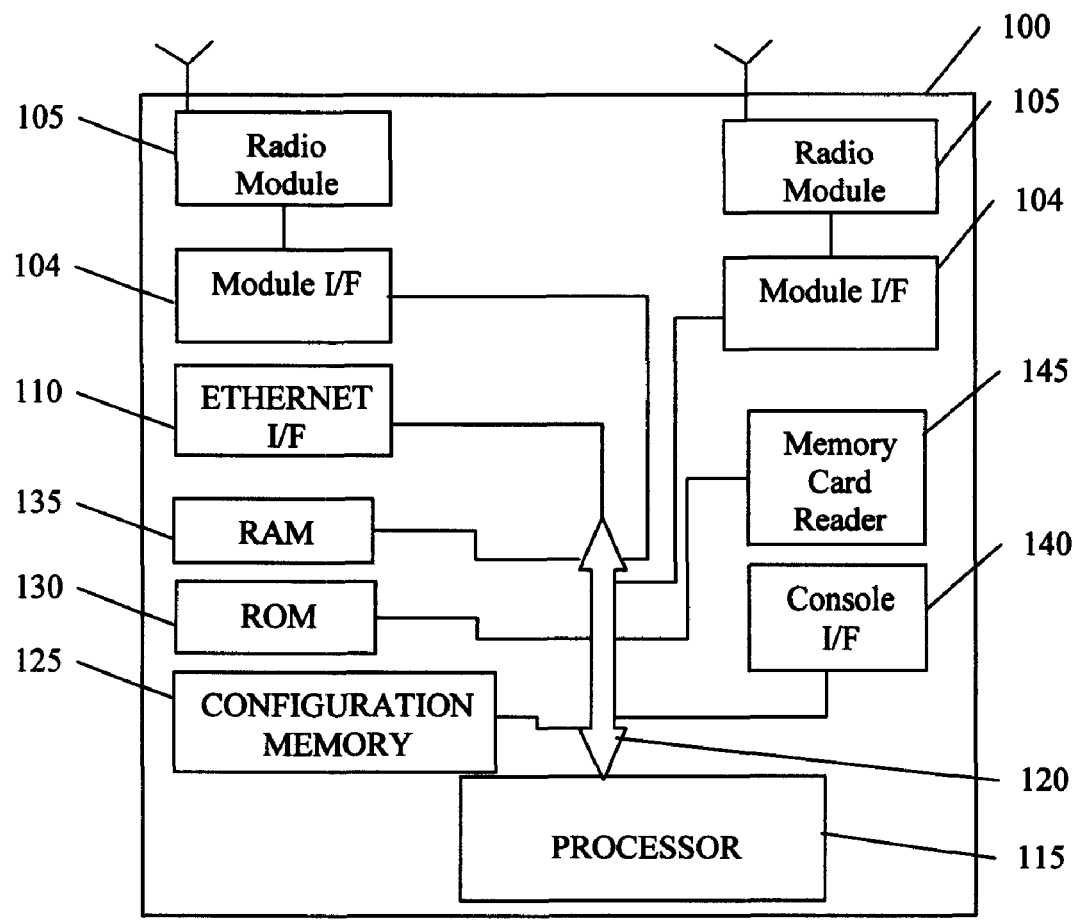
FIG. 1 illustrates an example device in the form of a wireless device for secure configuration.

In one embodiment of the invention, a method is provided for providing secure configuration of a device. The method includes obtaining a signed configuration file (S-CF) from a storage using a device identity of the device, wherein the device identity of the device is linked with a location of the device. The S-CF is then validated to generate a validated configuration file (V-CF). At least one device parameter is then configured using the V-CF.

In another embodiment of the invention, a method is provided for providing a signed configuration file (S-CF) to the device. The method includes processing a request for an S-CF from the device, wherein the request comprises a device identity of the device. A location of the device is then determined using a location database and the device identity. A configuration file (CF) is then obtained for the location of the device from a storage. The CF is then signed using an encryption key to generate the S-CF. The S-CF is then provided to the device.

In a further embodiment of the invention a system is provided for secure configuration of a device. The system comprises logic encoded in one or more tangible media for execution and when executed operable to obtain a signed configuration file (S-CF) from a storage using a device identity of the device, wherein the device identity of the device is linked with a location of the device; validate the S-CF to generate a validated configuration file (V-CF); and configure at least one device parameter of the device with the V-CF.

In a yet further embodiment of the invention a system is provided for providing a signed configuration file (S-CF) to a device. The system comprises logic encoded in one or more tangible media for execution and when executed operable to process a request for an S-CF from the device, wherein the request comprises a device identity of the device; determine a location of the device from a location database; obtain a configuration file (CF) for the location of the device from a storage; sign the CF into an S-CF using a signature key and an encryption key; and provide the S-CF to the device.

Description

Various embodiments of the invention provide a method and system for securely configuring a device with a location-based configuration file. This involves enabling the device to obtain an authentic copy of a configuration file (CF) from a manufacturer that is responsible for ensuring that the device operates within regulatory constraints applicable to a location of use. To supply a location-based CF, a device identity, such as a serial number of the device, is linked with a location of the device when it is ordered, delivered, or activated at the location, so that the corresponding location-based CF can be supplied to the device when requested by the device. Further, to provide an authentic copy of the CF, the CF is validated before configuring device parameters using the CF. In accordance with an embodiment of the invention, the CF, for example, is digitally signed and validated with a certificate that is issued either by the manufacture or a certificate authority (CA).

For ease of explanation the invention is described by reference to a wireless device. The invention is not limited to this embodiment but may be applied to any device subject to location-based constraints on device parameters.

FIG. 1 illustrates an example device in the form of a wireless device 100 that performs a method for providing secure configuration of the wireless device 100 with a validated configuration file (V-CF) obtained using a device identifier linked to a location of use of the wireless device 100, according to an embodiment of the present invention. The wireless device 100 comprises module interfaces 104, each of which is coupled to a radio module 105. The wireless device 100 also includes an Ethernet interface 110. The module interfaces 104 and the Ethernet interface 110 are in communication with a processor 115 through a data and address bus 120. The wireless device 100 also includes a configuration memory 125 for storing a V-CF. As will be apparent to a person skilled in the art, the configuration memory 125 may be a rewritable non-volatile memory of any type, such as a FLASH memory, or an EEPROM (Electronically Erasable Programmable Read Only Memory).

The wireless device 100 further comprises a Read Only Memory (ROM) 130 storing data for obtaining a signed configuration file (S-CF), validating the S-CF into a V-CF, and configuring device parameters of the radio modules 105 and/or the Ethernet interface 110 of the wireless device 100 with the V-CF. The Read Only Memory (ROM) 130 also includes data for configuring a network connection and various means of accepting configuration commands from remote hosts.

The wireless device 100 also includes a Random Access Memory (RAM) 135, a console interface 140, and a memory card reader 145 coupled to the processor 115 by the data and address bus 120. The memory card reader 145 provides access to an S-CF stored in any type of memory cards, such as a FLASH memory card.

The wireless device 100 can also receive an S-CF through the console interface 140 in communication with a terminal, such as a Teletype Network (TELNET) client running on a computer. For example, a user of the terminal can transfer a file containing S-CFs to the wireless device 100 by copying the file in a hard-disk-drive (HDD) or an optical disk, such as COMPACT DISK (CD) or Digital Versatile Disc (DVD), into the terminal, which then can transfer the file to the wireless device 100.

The wireless device 100 can also obtain the file containing S-CFs from various types of remote storages using the Ethernet interface 110. Utilizing a basic configuration file stored in the ROM 130 that is applicable to a global region, the wireless device 100 can also obtain the file containing location specific S-CFs using the radio modules 105 from various types of remote storages. For example, the basic configuration file may contain limited configuration settings for device parameters, such as restricted frequency bands and minimum transmit power, to reduce interference of the wireless device 100 in order to comply with many regional regulatory constraints. This way, a manufacturer can ship wireless devices 100 to many locations from a single SKU, and then each wireless device 100 configures itself to its full capability within the regulatory constraints of its location by obtaining a V-CF for the location.

In one embodiment, the wireless device 100 uses a Dynamic Host Configuration Protocol (DHCP) client to configure a network connection. Then, the wireless device 100 can communicate with remote hosts using a network communication mean, such as Web interface, Hypertext Transfer Protocol (HTTP), or File Transfer Protocol (FTP), to obtain the file containing S-CFs.

Figure 2:
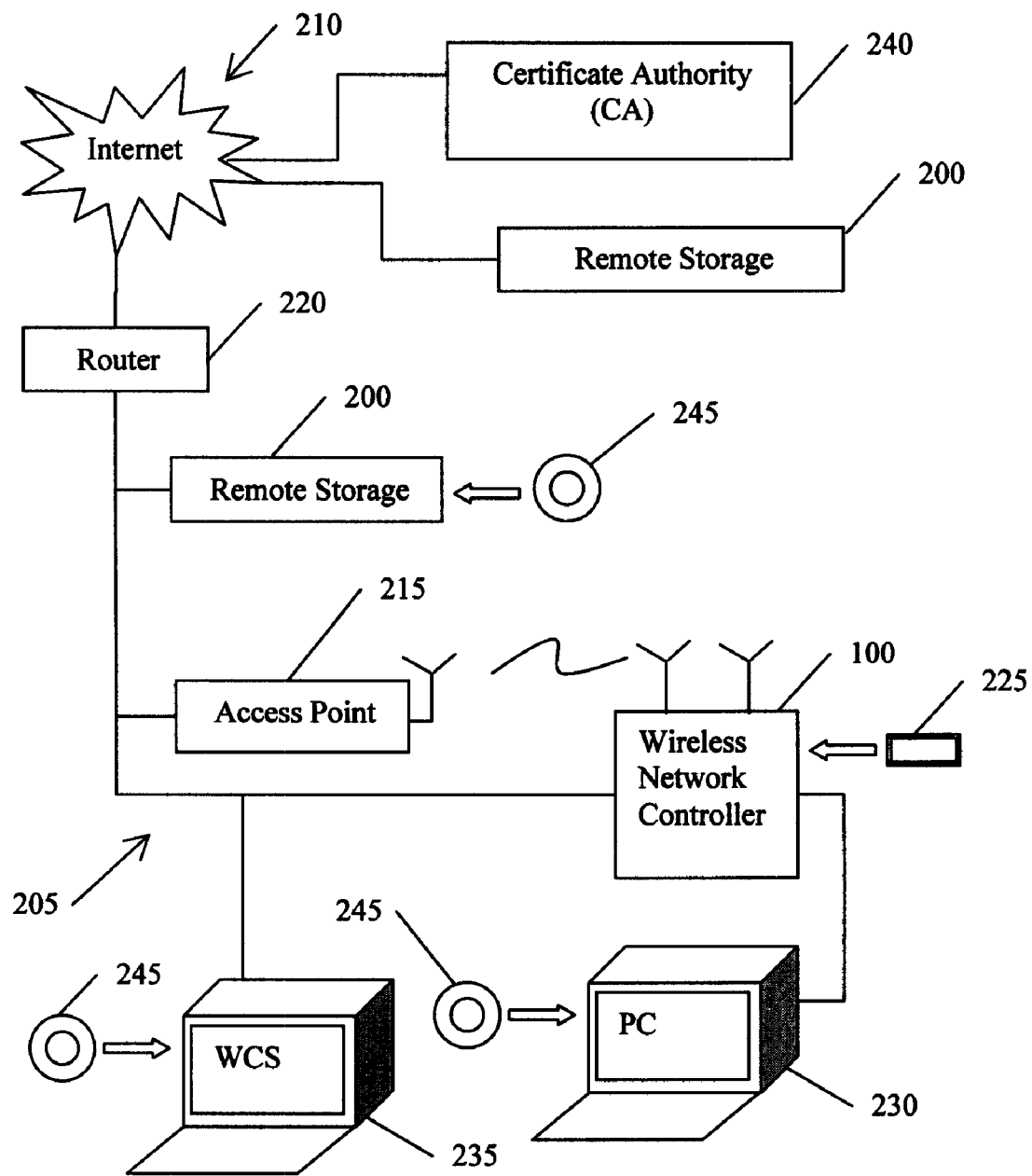
FIG. 2 illustrates an example situation where the wireless device is in communication with example remote storages located in a local network or accessible via the Internet.

FIG. 2 illustrates another embodiment of the invention where the wireless device 100 is in communication with remote storages 200 located in a local network 205 or accessible via the Internet 210 using the Ethernet interface 110. When the wireless device 100 is activated without a V-CF, it configures the radio modules 105 and/or the Ethernet interface 110 with the basic configuration file to enable a basic communication with a wireless access point 215 and/or a router 220, respectively, so that it can access the remote storages 200. Alternatively, the wireless device can access external storage devices, such as a memory card 225, through the memory card reader 145, a terminal 230 through the console interface 140, or a wireless control system (WCS) 235 through the radio modules 105 or the Ethernet interface 110.

A Certificate Authority (CA) 240 can provide certificates, with which the wireless device 100 can validate an acquired S-CF. For example, a certificate can be a digital certificate containing a decryption key. The decryption key may be a public key of a public key cryptography. The wireless device 100 can use the public key to decrypt a signature of the S-CF to obtain a first message digest, which is then compared with a second message digest generated by the wireless device 100 using a configuration file (CF) in the S-CF. The certificate can also contain an encrypted hash of data comprising the public key and other information provided in the certificate, such as vendor identity information. For example, the wireless device 100 uses a public key of the CA to decrypt the digital signature and validates whether the decryption key and the vendor identity information are authentic.

Figure 3:
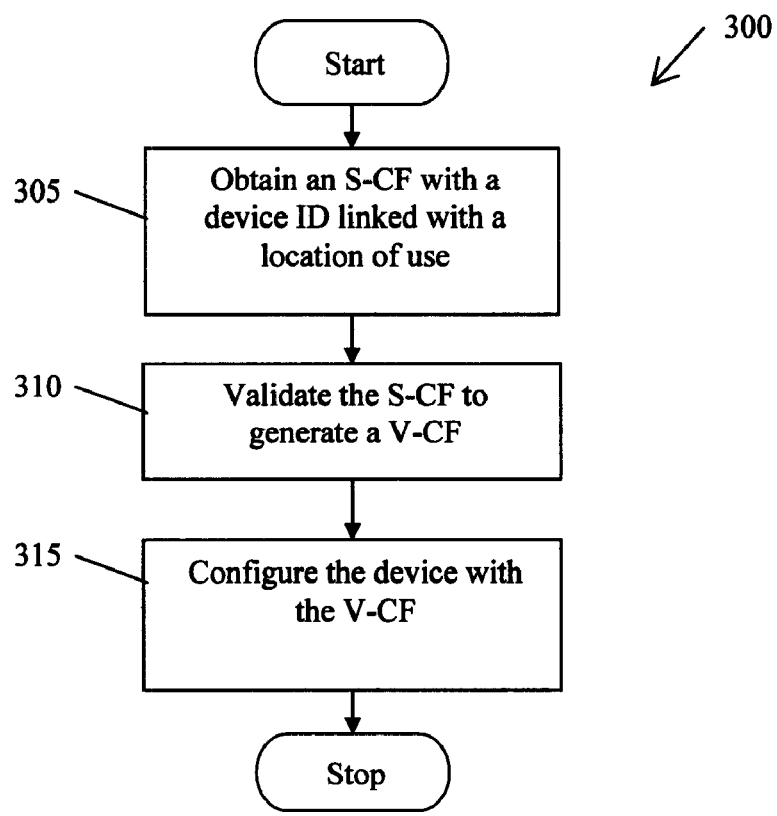
FIG. 3 illustrates an example method for obtaining a signed configuration file (S-CF) with a device identity, validating the S-CF to generate a validated configuration file (V-CF), and configuring the wireless device with the V-CF.

FIG. 3 illustrates an example method 300 for providing secure configuration of a device. For example, when the wireless device 100 has access to a storage containing an S-CF, either through the radio modules 105, the Ethernet interface 110, the console interface 140, or the memory card reader 145, the wireless device 100 can initiate the method 300.

At step 305, the device obtains an S-CF using a device identity of the device, where the device identity is linked with a location of the device. For example, a manufacturer of the wireless device 100 links the device identity with the location when it is sold, delivered, or activated. The manufacturer stores such link information in a location database. The manufacturer prepares the location database based on location information of wireless devices 100 to ensure that the wireless device 100 obtains the S-CF corresponding to the location of the wireless device 100. The device identity can be a serial number or any code that can be used to identify a configuration file (CF) containing location specific configuration data. For example, the device identity may comprise a model number and an Internet Protocol (IP) address because a model number can provide a device type and the IP address can provide location information.

In one embodiment, the device requests an S-CF from a storage using the device identity. For example, the wireless device 100 requests an S-CF from the remote storage 200 by sending a request message comprising the device identity. The remote storage 200 finds an S-CF for the device identity by identifying the location of the wireless device 100 in the location database containing link information between devices and locations of the devices. The location database can be a simple list of associations between device identities and locations.

In another embodiment, the device itself locates and obtains an S-CF using the device identity. For example, the wireless device 100 locates and obtains an S-CF using the device identity from a remote storage 200, a memory card 225, a terminal 230, or a wireless control system (WCS) 235 by accessing a file containing S-CFs, and then by locating a location specific S-CF using the device identity.

In further embodiment, the S-CF is a configuration file (CF) signed using a private key of an authorized entity. For example, the S-CF may comprise the CF and a signature encrypted using the private key. The signature can be a hash of the CF. The authorized entity may be a manufacturer of the wireless device 100 or a trusted third party of the manufacturer.

At step 310, the device validates the S-CF to generate a validated configuration file (V-CF). This ensures that the S-CF is from an authorized entity that is responsible for ensuring that the device operates within the regulatory constrains of the location where the device is activated.

In one embodiment, the device validates the S-CF using a public key of an authorized entity. For example, the wireless device 100 can decrypt a signature of the S-CF, and use the decrypted signature to validate the S-CF. The device may obtain the public key from a memory of the device.

In another embodiment, the device obtains the public from a certificate issued from a certificate authority. The device then validates the certificate with the certificate authority (CA). For example, the wireless device 100 can obtain the public key from a certificate contained in the S-CF and contact the CA 240 to validate the certificate. This ensures that the public key belongs to an authorized entity.

At step 315, the device configures at least one device parameter of the device with the V-CF. For example, the wireless controller 100 stores the V-CF in the configuration memory 125 to configure device parameters that are subject to regulatory constraints, such as transmit power of the radio modules 105. At this stage, the wireless device 100 can operate at its full capacity within regulatory constraints of the location.

Figure 4:
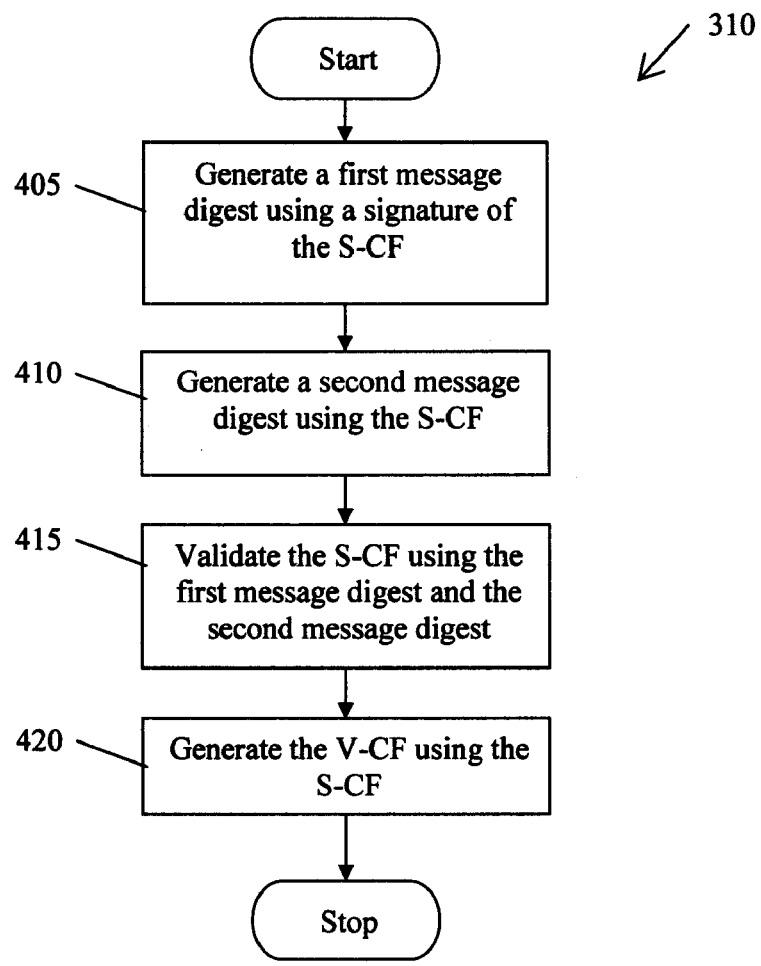
FIG. 4 illustrates an example method for validating the S-CF to generate the V-CF.

FIG. 4 shows an example method 400 for validating the S-CF to generate the V-CF. At step 405, a first message digest is generated using a signature of the S-CF. For example, the wireless device 100 can generate the first message digest by decrypting the signature with a decryption key. The decryption key may be a public key of an authorized entity. At step 410, a second message digest is then generated using the S-CF. The first message digest and the second message digest can be a hash of a configuration file (CF) in the S-CF. Alternatively, the first message digest and the second message digest can be a hash of data comprising a validation key and the CF. As will be apparent to a person skilled in the art, any known hashing method, such as CRC, MD4, MD5, SHA-1, Whirlpool, or Tiger, can generate the hash for the message digests.

The validation key can be manufacturer identity information, a device identity, a device group identity, or a shared password. The validation key can be stored in a memory of the wireless device 100. Advantages of using a validation key include device specific validation of the S-CF. For example, if the validation key is a serial number, the wireless device 100 can check whether the S-CF is specifically designed for that particular wireless device 100 having the serial number.

At step 415, the S-CF is then validated using the first message digest and the second message digest. For example, to validate authenticity of the CF in the S-CF, the wireless device 100 can compare the two message digests for equality if they are a hash of the CF or a hash of data comprising the CF and a validation key. At step 420, the V-CF is then generated using the S-CF. For example, the wireless device 100 can use the CF in the S-CF as the V-CF since the S-CF is validated.

Figure 5:
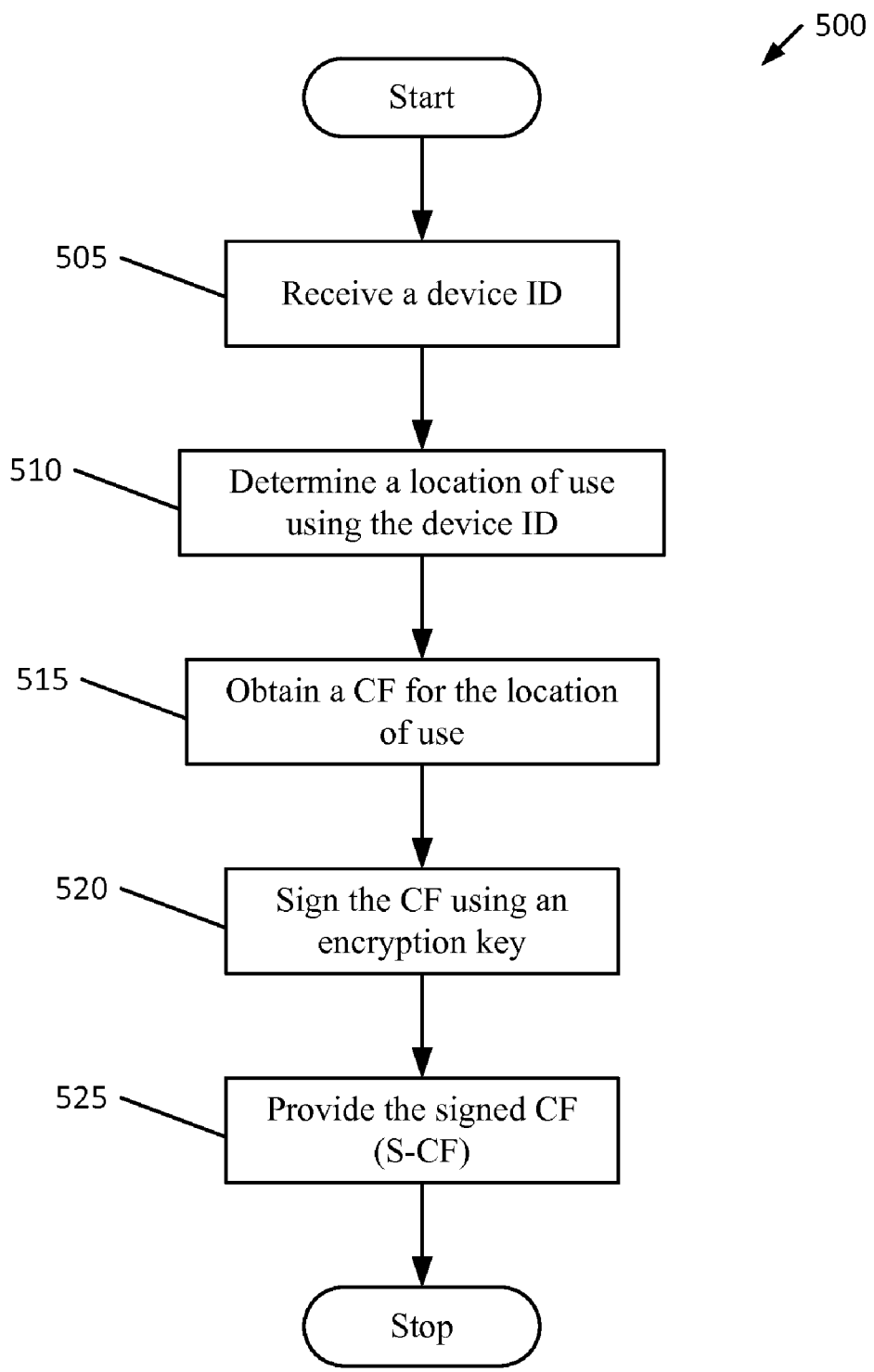
FIG. 5 illustrates an example method for providing an S-CF to a device, a customer or installer of the device.

FIG. 5 shows an example method 500 for providing an S-CF to a device, according to further embodiments of the present invention. At step 505, a request for an S-CF from the device is processed. For example, the remote storage 200 can receive the request comprising a device identity, such as a serial number of the wireless device 100, from the wireless device 100. The device identity can be a serial number or any code that can be used to identify a configuration file (CF) containing location specific configuration data.

At step 510, a location of the device is determined using the location database and the device identity. For example, the remote storage 200 uses the link information stored in the location database to determine the location of the wireless device 100 requesting the S-CF.

At step 515, a configuration file (CF) is obtained for the location from a storage, such as a database in an optical disk 245 or a hard disk drive. For example, the remote storage 200 identifies a device type, such as a model number, of the wireless device 100 and obtains the CF for the location by looking up an index linking locations, device types, and CFs.

At step 520, the CF is signed using an encryption key to generate the S-CF. In one embodiment, the encryption key is a private key of an authorized entity. For example, the S-CF comprises a signature and the CF. The signature can be a first message digest encrypted using the encryption key. The first message digest can be a hash of the CF. Alternatively, the first message digest can be a hash of data comprising the CF and a validation key. The validation key can be a device identity, a device group identity, or a shared password. The hashing method can be one of known hashing methods, such as CRC, MD4, MD5, SHA-1, Whirlpool, or Tiger.

At step 525, the S-CF is provided to the device. For example, the remote storage 200 sends the S-CF to the wireless device 100 using a known data transfer protocol, such as Hypertext Transfer Protocol (HTTP) or File Transfer Protocol (FTP).

Figure 6:
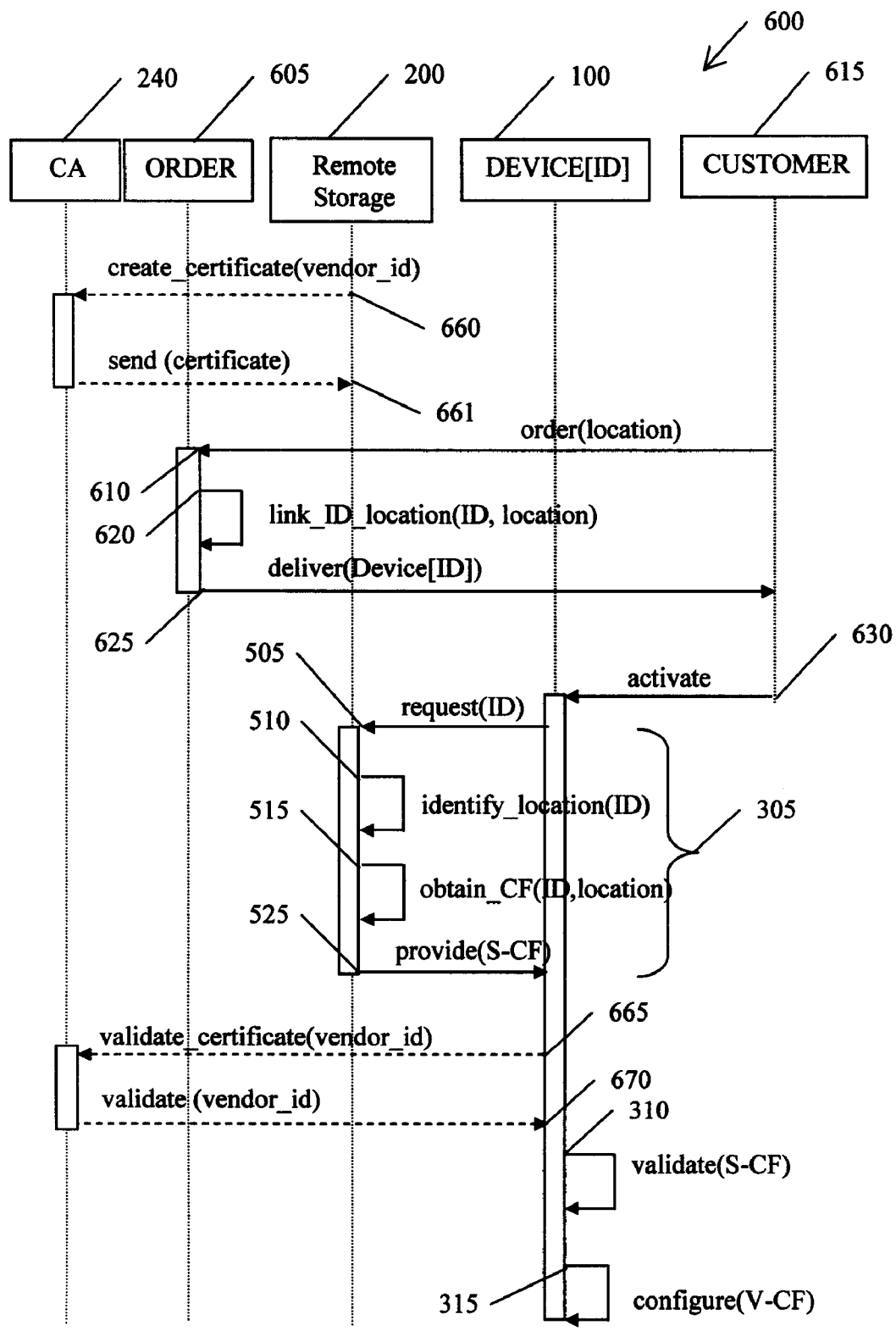
FIG. 6 illustrates an example sequence of distributing devices to customers and performing secure configuration of devices.

FIG. 6 shows a sequence diagram 600 depicting an example of using a single SKU to distribute wireless devices 100 to customers through an order management system 605 and performing secure configuration of the wireless devices 100, according to an embodiment of the present invention. At step 610, when a customer 615 orders a wireless device 100, a location and a device identity of the wireless device 100 are linked and stored in a remote storage 200 at step 620. At step 625, the wireless device 100 is delivered to the location. At step 630, the customer activates the wireless device 100 at the location. At step 505, the remote storage 200 processes a request for an S-CF from the wireless device 100, where the request comprises the device identity. At step 510, the remote storage 200 identifies a location of the wireless device 100 by looking up the location database with the device identity. At step 515, the remote storage 200 obtains a CF for the location from a storage. At step 525, after the CF is signed using an encryption key to generate an S-CF, the remote storage 200 sends the S-CF to the wireless device 100. At step 310, the wireless device 100 validates the S-CF to generate a V-CF. At step 315, the wireless device 100 configures device parameters using the V-CF.

Optionally, at step 660, the order management system 605 can create a certificate by depositing one or more of a vendor identity, a validation key, an encryption key, or a decryption key in a CA 240. The wireless device 100 can obtain and/or validate the certificate by contacting the CA 240 as illustrated by step 665 and step 670. This means that the validation key and/or the decryption key are no longer stored in the wireless device 100. Advantages of this approach include flexible management of decryption keys and validation keys, and reduced security risk.

In summary, the various embodiments of the invention provide secure remote configuration of a device based on location information of the device to comply with regulatory constraints of the location of use of the device. Location information of a device is obtained when the device is sold, delivered, or activated. A device identity of the device and its location are linked in a location database either in a remote storage 200 or an external storage, such as a memory card 225 or an optical disk 245. The device obtains a location specific S-CF from various storage devices, such as the remote storages 200, using the device identity. The device, subsequently validates the S-CF against an authorized entity, such as a manufacturer, to ensure that configuration of the device is controlled by the authorized entity that is responsible for ensuring that the device operates within regulatory constraints of the location of use of the device.

Advantages of the present invention thus include reducing the number of SKUs, each of which defining a group of configured devices for a region or country for order and shipment. This means that manufacturers need to manage fewer SKUs. Manufactures can also automate system updates and upgrades of any devices subject to location-based constraints on device parameters.

In the foregoing specification, although the invention has been discussed with reference to specific embodiments, these embodiments are merely examples for purposes of illustrations, rather than restrictive, of the invention. For example, one of ordinary skill in the art appreciates that a "method for secure configuration of a device" can include any type of manual or automatic cryptography methods or protocols, to provide secure configuration.

Although specific example procedures have been used to illustrate various embodiments, those skilled in the art will also appreciate that embodiments of the present invention can use other cryptography methods, validation methods, storage methods, procedures or standards. Use of the terms "user", "customer", "database", "host", "storage", "module", "interface", "controller", and "console" can include any type of device, operation, or other process. Use of the terms "key", "signature", "identity", "certificate", and "location" can include any type of data, such as a string of numeric letters, non-numeric letters, or a combination of both types of letters.

In addition, any suitable specification language can be used to implement methods and computer readable program code components of the present invention including workflow definition languages, VHDL, Verilog, C, Java, etc. The implementations can execute using a variety of processor, non-processor approaches or a combination of the two approaches, such as central processing on a single processor or multiprocessors, distributed processing, parallel processing, signal processing by a digital signal processor (DSP), a virtual processing on a Java virtual machine, or custom logic on FPGA or ASIC. The implementations can execute on a variety of types environments interacting and/or sharing resources with other entities or processes, such as a work flow engine, a Web server, an operating system, a Java virtual machine, etc.

Thus, while the present invention has been described herein with reference to particular embodiments thereof, other variations and embodiments are possible in light of above descriptions, and it is thus intended that the scope of invention defined solely by claims following including any amended claims made during this application. It is also intended that the invention not be limited to the particular terms used in the following claims, but that the invention will include any and all embodiments and equivalents falling within the scope of the following claims.

I claim:

1. A method comprising:
    obtaining location data representative of a location of use for a wireless device;
    obtaining link data linking device identity data representative of an identity of the wireless device with the location data representative of the location of use for the wireless device;
    storing the link data in an associated database;
    receiving a request for a signed configuration file from the wireless device, wherein the request comprises the device identity data representative of the identity of the wireless device;
    responsive to the request, determining from the associated database the location of use of the wireless device based on the link data and the device identity data of the request;
    obtaining from an associated storage a location specific configuration file in accordance with the determined location of use of the device, wherein the location specific configuration file comprises device parameters for ensuring that the device operates within regulatory constraints for the determined location of use responsive to the request;
    signing the location specific configuration file using an encryption key to generate the signed configuration file; and
    providing the signed configuration file to the wireless device.

2. The method of claim 1, wherein the encryption key is a private key of an authorized entity.

3. Logic encoded in one or more tangible media for execution and when executed operable to:
    obtain location data representative of a location of use for a wireless device;
    obtain link data linking device identity data representative of an identity of the wireless device with the location data representative of the location of use for the wireless device;
    storing the link data in an associated database;
    receive a request for a signed configuration file from the wireless device, wherein the request comprises the device identity data representative of the identity of the wireless device;
    responsive to the request, determine from the associated database the location of use linked with the identity data representative of the identity of the wireless device based on the link data and the device identity data of the request;
    obtain from an associated storage a location specific configuration file in accordance with the determined location of use for the wireless device, wherein the location specific configuration file comprises device parameters for ensuring that the wireless device operates within regulatory constraints for the determined location of use responsive to the request;
    sign the location specific configuration file using an encryption key to generate the signed configuration file; and
    provide the signed configuration file to the wireless device.

4. The logic of claim 3, wherein the encryption key is a private key of an authorized entity.

5. The logic of claim 3, wherein the device identity is a serial number.

6. The logic of claim 3, wherein the configuration file comprises data representative of frequency bands.

7. The logic of claim 3, wherein the configuration file comprises data representative of restricted frequency bands.

8. The logic of claim 3, wherein the configuration file comprises data representative of transmit power.

9. The method of claim 1, wherein the device identity is a serial number.

10. The method of claim 1, wherein the configuration file comprises data representative of frequency bands.

11. The method of claim 1, wherein the configuration file comprises data representative of restricted frequency bands.

12. The method of claim 1, wherein the configuration file comprises data representative of transmit power.

* * * * *